United States Patent
Yamada et al.

(10) Patent No.: US 6,949,848 B2
(45) Date of Patent: Sep. 27, 2005

(54) TERMINAL FOR ARMATURE

(75) Inventors: Takashi Yamada, Mori-machi (JP);
Hisanobu Higashi, Mori-machi (JP);
Hideaki Takahashi, Mori-machi (JP)

(73) Assignee: Kabishiki Kaisha Moric, Mori-Machi (JP)

(*) Notice: Subject to any disclaimer, the term of this patent is extended or adjusted under 35 U.S.C. 154(b) by 0 days.

(21) Appl. No.: 10/709,560

(22) Filed: May 13, 2004

(65) Prior Publication Data
US 2004/0232785 A1 Nov. 25, 2004

(30) Foreign Application Priority Data
May 22, 2003 (JP) ........................................ 2003-144269

(51) Int. Cl.⁷ ................................................ H02K 3/04
(52) U.S. Cl. .......................... 310/71; 310/260; 29/596
(58) Field of Search ...................... 310/71, 260; 29/596

(56) References Cited

U.S. PATENT DOCUMENTS

| | | | | |
|---|---|---|---|---|
| 3,984,712 A | * | 10/1976 | Hill .............................. | 310/71 |
| 4,096,625 A | * | 6/1978 | Morreale ...................... | 29/596 |
| 4,224,543 A | * | 9/1980 | Morreale ...................... | 310/71 |
| 5,717,273 A | * | 2/1998 | Gulbrandson et al. ....... | 310/260 |
| 5,828,147 A | * | 10/1998 | Best et al. .................... | 310/71 |
| 5,861,689 A | * | 1/1999 | Snider et al. ................. | 310/71 |
| 6,566,779 B2 | * | 5/2003 | Takano et al. ............... | 310/214 |
| 6,664,677 B2 | * | 12/2003 | Tanaka et al. ................ | 310/71 |
| 6,856,055 B2 | * | 2/2005 | Michaels et al. ............. | 310/71 |
| 6,873,074 B2 | * | 3/2005 | Mimura ....................... | 310/71 |

FOREIGN PATENT DOCUMENTS

JP 06-233483 A 8/1994

* cited by examiner

Primary Examiner—Joseph Waks
(74) Attorney, Agent, or Firm—Ernest A Beutler

(57) ABSTRACT

An electrical armature having a wiring board embodying conductive plates with wire end receiving terminals to receive and hold the wire ends of the coils while they are fused to the terminals.

9 Claims, 8 Drawing Sheets

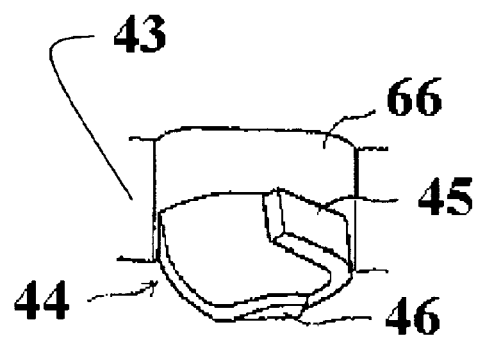
FIG. 9
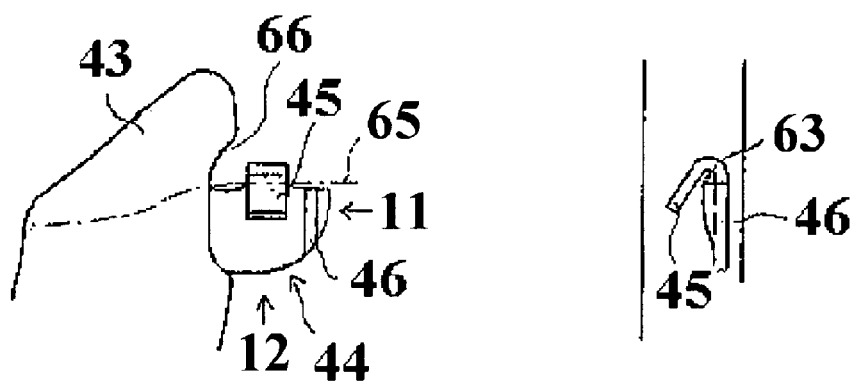
FIG. 10  FIG. 11
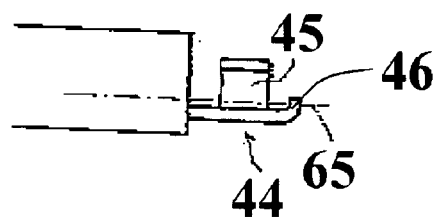
FIG. 12

TERMINAL FOR ARMATURE

BACKGROUND OF INVENTION

This invention relates to a terminal for the armature of an electrical machine and more particularly to one that facilitates and simplifies the connection to coil winding ends.

As is well known, in rotating electrical machines the armature normally has a plurality of circumferentially spaced pole teeth around which electrical coils are wound. Regardless of whether the machine is a generator or a motor, it is necessary to provide a connection between the wire ends of the coils with each other in one or more phases and also to an external terminal to either deliver the generated electrical power, in the case of a generator, or to receive electrical power, in the case of a motor. This presents several difficulties and challenges to automated manufacture.

For example published Japanese Patent Application, publication number Hei 6-233483 shows a construction in which a wire connection base board (terminal wiring unit) is positioned at an axial end of the armature. The wire ends of the coils (both the winding head and winding tail) for each phase of the armature is connected to a respective terminal of the terminal wiring unit. The wire connection unit disclosed therein is made up of a unit main body; first, second and third phase-specific terminal members (conductive members) corresponding to respective phases of the stator, such as a U-phase, a V-phase and a W-phase; a common conductive member; and plural insulators for insulating these conductive members.

The phase-specific terminal members (conductive members) are of the same shape as each other. That is each has a member body (main body) generally of a C-shape made of a conductive material such as a copper sheet provided integrally with plural projections at its outer peripheral edge. The lower part of each projection is provided integrally with a securing portion generally of a U-shape. The phase-specific terminal members are spaced from each other in the axial direction relative to the unit main body. The wire ends of the coils extending from the armature are connected by soldering to the securing portions of the phase-specific terminal members when so assembled.

Obviously, the work of interconnecting the wire connection unit and the coil ends is labor intensive, since the worker has to draw out wire ends from the coils of the stator, engage them with the securing portions, and carry out soldering while maintaining them in the securing portions In addition, since the phase-specific terminal members are embedded in an insulating material when so placed, the axial positions of the terminals are different for respective phases so that the work of joining with solder is cumbersome and time consuming.

Therefore it may be thought to use a fusing method for joining, by placing the wire end in a terminal of a U- or V-shaped section and fuse and join the elements while crimping the terminal. In such a fusing method, the objects to be joined together are placed between an electrode bar and an electrode receiver, heated while being pressed with the electrode bar, and joined together by fusing one or both of the objects to be joined together. Since this method requires no intervening matter such as solder and has the possibility of automation, considerable advantage can be obtained in cost and product improvement in comparison with the conventional wire connection by soldering.

However, when the wire end is simply placed in a terminal of a U- or V-shaped section, for crimping the terminal with an electrode bar and fusing, the wire end occasionally slips off at the time of fusing because of the shape of the section of the terminal, causing poor reliability in joining the wire end to the terminal.

Therefore it is a principal object of the invention to provide an improved terminal construction in which displacement of the wiring ends during attachment is prevented.

SUMMARY OF INVENTION

This invention is adapted to be embodied in a terminal for an electrical armature for connecting a plurality of coil windings to an external connection. The terminal has an arcuate plate like portion formed from an electrically conductive material and at least one terminal tab extending in an axial direction from the plate like portion for receiving an external connecting member. A plurality of coil end winding terminals are spaced around the circumference of the plate like portion for connection to coil winding ends. The coil end winding terminals are comprised of a pair of angularly related portions defining a gap to receive a coil winding end and a retaining portion facing the gap and positioned and configured to prevent a coil winding end from moving transversely out of the gap.

BRIEF DESCRIPTION OF DRAWINGS

FIG. 9 is a further enlarged view of the area encompassed by the circle 9 in FIG. 3.

FIG. 10 is an enlarged view showing one of the terminal ends.

FIG. 11 is a view looking in the direction of the arrow 11 in FIG. 10.

FIG. 12 is a view looking in the direction of the arrow 12 in FIG. 10.

DETAILED DESCRIPTION

Figure 1:
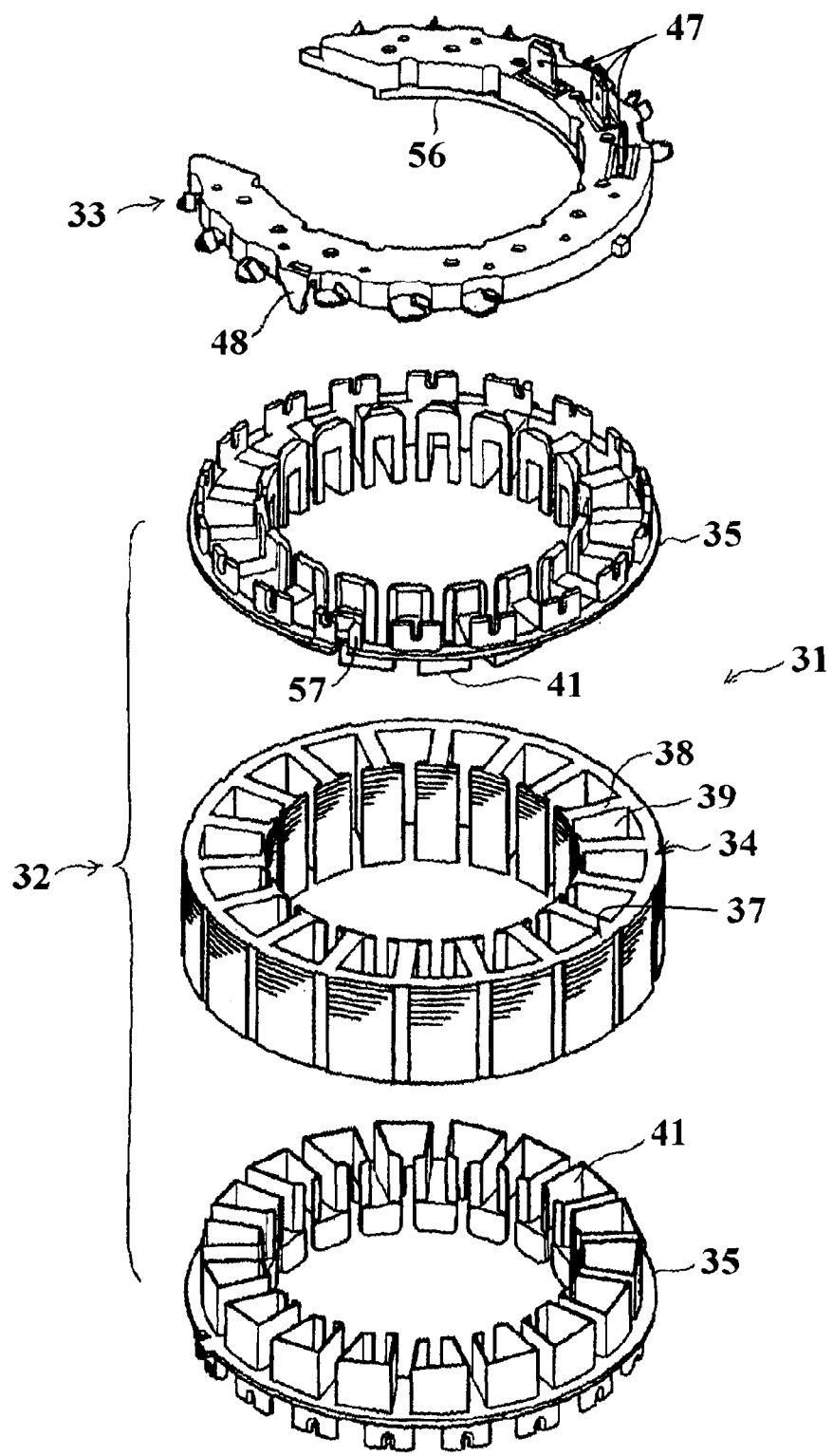
FIG. 1 is an exploded, perspective view of an armature constructed in accordance with the invention.

Referring now in detail to the drawings and initially to FIG. 1, the reference numeral 31 indicates generally an armature of a rotary electric machine embodying to this invention. As illustrated the armature 31 is specifically utilized as an armature for a 3-phase motor, although those skilled in the art will readily understand that it can be utilized with other types of motors or generators. It is comprised of a wound core, indicated generally at 32, and a wiring base 33 acting as a coil end circuit fixed in a manner to be described to one axial end (top end side in the FIG. 1) of the wound core 32.

The wound core 32 is comprised of a core yoke, indicated generally at 34, made as a body of laminated thin plates, upper and lower bobbin half insulators 35, and coils 36 (See FIG. 2) wound on the wound core yoke 34 around the insulators 35. The core yoke 34 has a ring shape portion, indicated at 37, from which in this embodiment, extend radially inwardly a plurality of circumferentially spaced magnetic pole teeth 38 so as to surround the periphery of a rotor 36.

Slots 39 are formed between adjacent magnetic pole teeth 38. The faces of the insulators 35 are integrally formed with insertion lugs 41 of the same number as the slots 39 so that when the ring-like insulator 35 are inserted upward and downward into the slots 39 both insulators 35 are circumferentially secured and held to the core yoke 34 in the desired circumferential relation. As will be described later again, coil wire is wound up and down over the insulators 35 through the slots 39 located on both sides of each magnetic pole tooth 38, so that plural coils 36 (FIG. 2) are arranged in circumferentially spaced positions.

Figure 3:
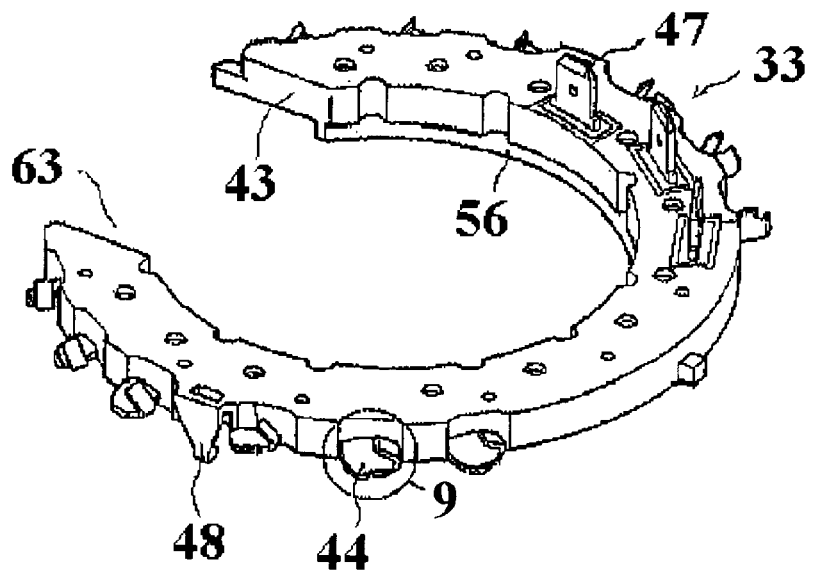
FIG. 3 is an enlarged perspective view of the wiring base.
Figure 4:
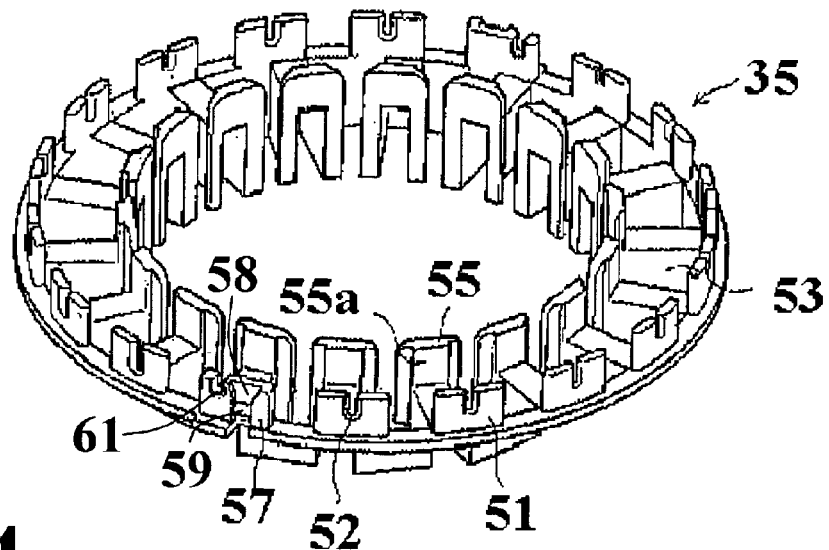
FIG. 4 is an enlarged perspective view of one of the bobbin halves.

The wiring base 33 is attached to the top surface of the wound core 32, in a manner to be described, and is shown best in FIGS. 3–4 and as is described in the co-pending application of the assignee hereof entitled ARMATURE OF ROTARY ELECTRICAL APPARATUS, Ser. No. 10/709243, filed Apr. 23, 2004. The wiring base 33 is of a three layer construction made up of ring-like, phase-specific terminal members 42 (See FIGS. 7 and 8) corresponding to three phases of U, V, and W placed one over another in the axial direction and insulated from each other. The phase-specific terminal members 42 are made into a single body by insert mold forming with a resin material. As shown in FIG. 3, the wiring base 33 is of a ring shape (C shape) made as a single body with a molded resin 43.

Each phase-specific terminal member 42 has plural terminal lugs 44 projecting radially outward for connecting a winding head or winding tail of each winding end portion, to be identified later, of the coil 36 of each phase. The terminal lug 44 has its tip bent as shown in the enlarged view FIG. 9 so that a worker can easily tie and hold the winding end portion around the terminal lug 44 when the coil winding end is to be connected. Continuing to refer to FIG. 9 and as will be described in more detail later, the reference numeral 45 denotes a bonding purpose bend for clinching and bonding the winding end, and a bend 46 for retaining the winding end from coming off.

Each phase-specific terminal member 42 also has an integrally formed, axially extending external connection terminal 47 corresponding to each of the three phases of U, V, and W. As shown in FIG. 3, the external connection terminal 47 is formed to project from axially one side face of the wiring base 33 toward the opposite side of the wound core 32 by bending part of the phase-specific terminal member or by initially punch-raising from the main part of the member when it is formed.

The periphery of the wiring base 33 has integrally formed plural (two at diametrically opposite positions in the example illustrated) hooks 48, as is described in the aforenoted co-pending application, serving as secure-holding means to properly position the wiring base 33 relative to the insulator 35 when fitted into the wound core 32 and to secure the wiring base 33 to the wound core 32. Each of the hooks 48 is formed in a triangular shape, projecting down from the end face of the wiring base 33 to be elastically, radially deformable. The tip of the hook 48 is formed with a barb 49 that projects radially inward.

The configuration and construction of the insulator 35 to accommodate and make the connection to the wiring base 33 will now be described with reference primarily to FIG. 4. The insulator 35 is formed like the core yoke 34 in a ring shape. Formed on its axial periphery are a plurality of winding receivers, indicated generally at 51 in the same number (18) as the pole teeth 36 for engage-stopping the coil winding end. Each winding receiver 51 is formed with a cut 52 through which the winding end of the coil is led radially outwardly of the insulator 35.

The insulator 35 is also formed integrally with plural winding portions 53 that extend radially inward from the winding receivers 51. The winding portions 53 are aligned with the magnetic pole teeth 38 (FIG. 1) of the core yoke 34 by the pole teeth 38 being fitted into recesses 54 formed on the side of the insulator 35 adjacent the core yoke which embrace the pole teeth 38. The slots 39 are formed between adjacent winding portions 53. The aforementioned insertion lugs 41 are formed under the winding portions 53 in the area between them. Each winding portion 53 has on its radially inner side a curved flange 55 for supporting and retaining the inside of each coil.

The winding of the coil 36 is retained at one end by the inside round portion of the flange 55. Incidentally, the winding comprises the part of the coil 36, formed by winding a wire passing through the slot 39 (FIG. 1) up and down around the magnetic pole tooth 38. The coil winding is held and supported between the flange 55 formed on the inside round surface side of both the upper and lower insulators 35 and the winding receiver 51. An annular projection 56 (FIG. 3) on the underside of the wiring base 33 is engaged with a back surface 55a of the flange 55 supporting the coil end. In this way, the insulators 35 and the wiring base 33 are held in the same radial position.

The round periphery of the insulator 35 is further formed integrally with a plurality of circumferentially spaced hook receivers 57 equal in number and spacing to the number and spacing of the hooks 48 for receiving the hooks 48 of the wiring base 33. Thus in this embodiment the hook receivers 57 are diametrically positioned.

These hook receivers 57 are shown best in FIG. 4 and are more fully described in the aforenoted co-pending application. The hook receivers 57 are formed like the winding receiver 51 to project upward from the end face of the insulator 35. The hook receivers have a round periphery side formed with a recess 58 to receive the hook 48. The recess 58 is triangular so as to be generally complementary to the hook 48. The end of the recess 58 is formed with a projection 59 for engaging with the barb 49 formed at the tip of the hook 48. The hook receiver 57 is also provided with a cut 61, next to the recess 58, for passing the wiring end of the coil 36. Each hook 48 is capable of elastically bending about a center specifically the connection point between the hook 48 and the main part of the molded resin 43. When the hook 48 engages with the hook receiver 57, the tip of the hook 48 slightly deflects radially outward and then the barb 49 snap-engages with the projection 59 of the hook receiver 57.

Figure 5:
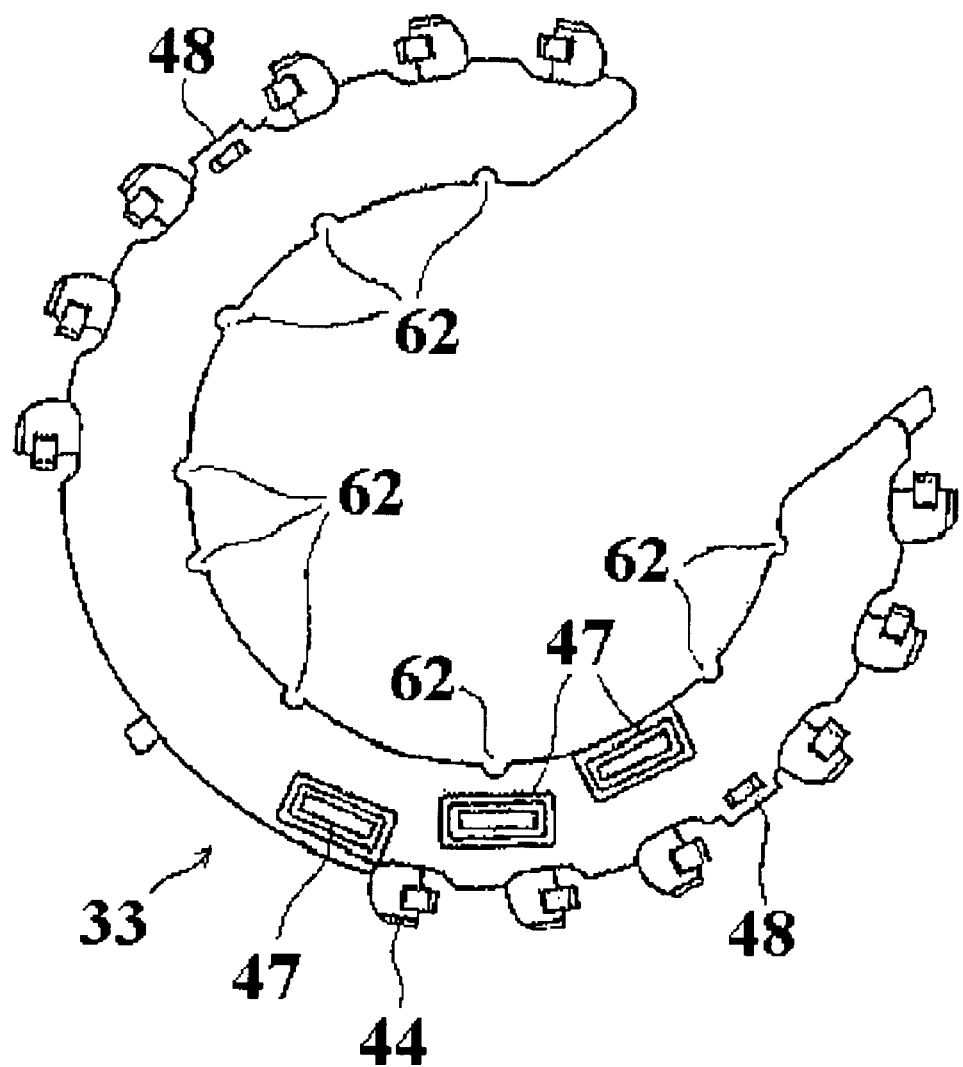
FIG. 5 is a side elevational view of the wiring base.
Figure 6:
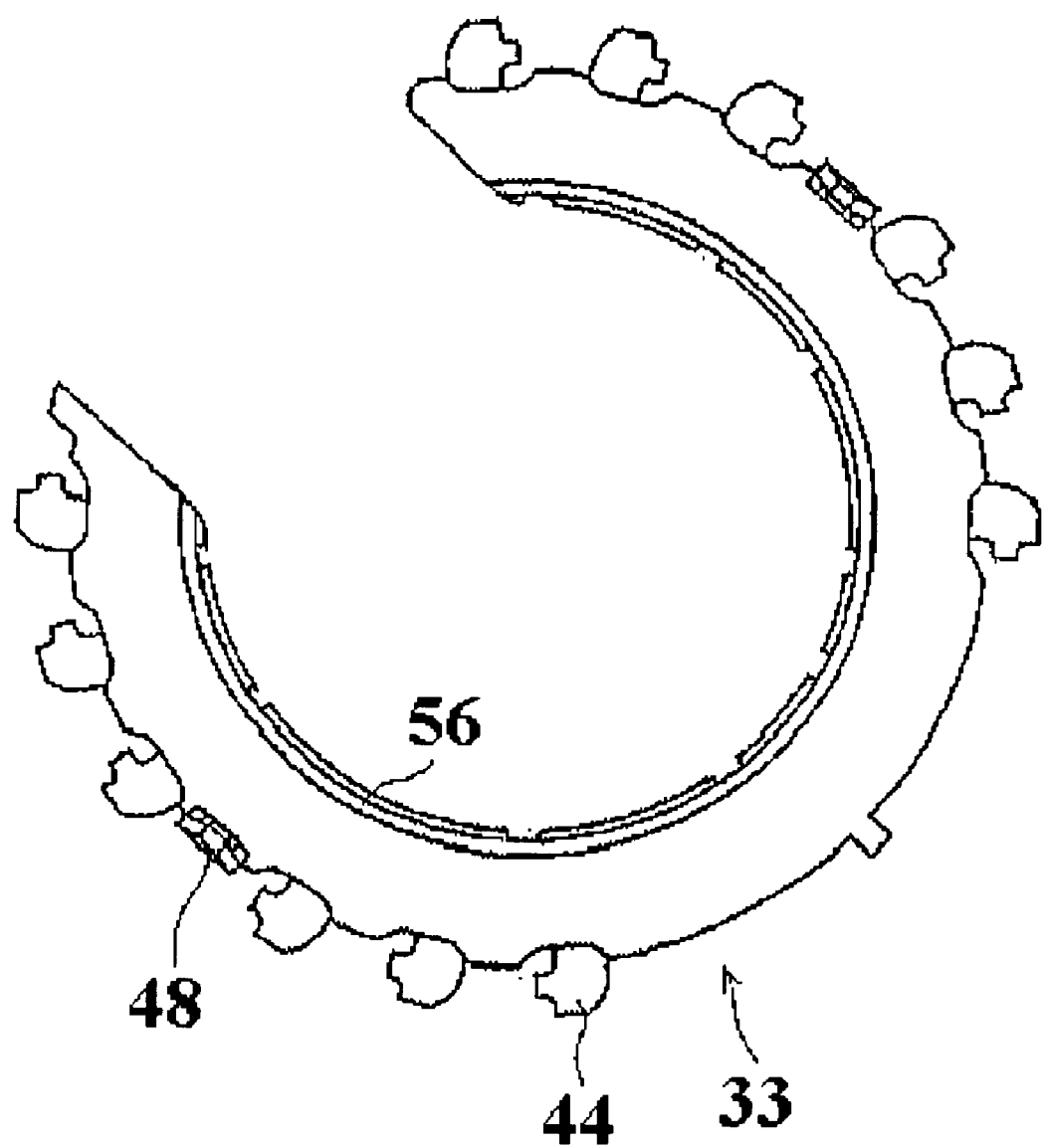
FIG. 6 is an elevational view of the wiring base showing the side opposite that shown in FIG. 5.

Referring now to FIGS. 5 and 6, these show respectively the outer and inner faces of the wiring base 33. As seen in these figures, the terminal lugs 44 are formed to project radially outward from and spaced along the round periphery of the molded resin 43 of the wiring base. The three external connection terminals 47 project from positions different in both radial and circumferential locations on the wiring base 33.

The inside round surface of the molded resin 43 is provided with plural, circumferentially spaced axial grooves 62. These grooves 62 are recesses, formed by projections formed on the side of a metallic mold, for radially positioning (centering) all the ring-like phase-specific terminal members 42 as seen in FIGS. 7 and 8 positioned at three different levels.

As previously mentioned and as best seen in FIGS. 3 and 6, an annular (C shape in this embodiment) projection 56 is formed along the inside round surface of the underside of the wiring base 33. The annular projection 56 is for locating the wiring base 33 and the insulators 35 on a common axis as the annular projection 56 fits in tight contact with the back surface 55a (radially outer side) of each flange 55 while the hook 48 engages with the hook receiver 57 at the time of attaching the wiring base 33 to the insulators 35 which are integral with the wound core 32.

Figure 7:
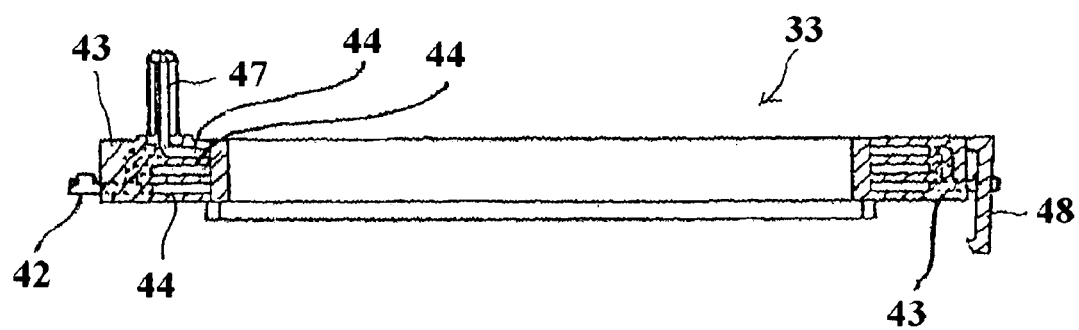
FIG. 7 is a cross sectional view of the wiring base.
Figure 8:
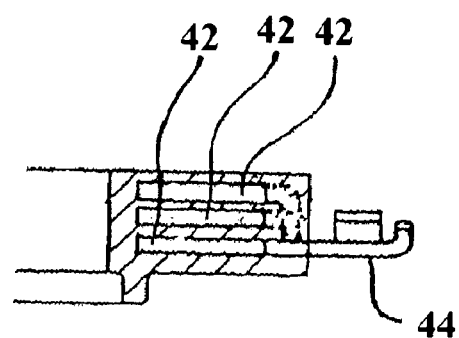
FIG. 8 is a further enlarged cross sectional view of the wiring base taken through one of the terminals.

Referring now to FIG. 7 the three ring-like, phase-specific terminal members 42 are embedded in the molded resin 43, at three levels in the axial direction, corresponding to the three phases of U, V, and W, in the wiring base 33. As shown, part of the top most phase-specific terminal member 42 bends upward and projects out of the molded resin 43 to serve as the external connection terminal 47. Although not shown in this figure, but see FIG. 1, parts of other phase-specific terminal members 42 also bend likewise to serve as the rest of the external connection terminals 47. One of the terminal lugs 44 appears in this figure as does one of the hooks 48.

FIGS. 9–12 show the appearance of the terminal lugs 44 projecting on the periphery of the wiring base 33. As is clear from these views and FIGS. 7 and 8, the terminal lug 44 is made by punching the metallic sheet of the terminal members with the appropriate number of flat projections of the required shape followed by bending operations, with its tip having the two bends 45 and 46.

As shown in FIG. 11, the first terminal portion 45 is formed by bending back part of the terminal member 42 in a V-shape so as to oppose one end face of the terminal main portion 64. The first terminal portion 45 thus forms a gap 63 between itself and a terminal main portion 64 for receiving the wire end, shown in phantom in these figures and indicated by the reference numeral 65, and constitutes the fusing terminal 45 for placing and fusing the wire end 65.

As shown in FIGS. 10–12, the other, second terminal portion 46 is made by bending the arcuate outer peripheral end of the terminal upright toward the same side as the first terminal portion 45. Since the second terminal portion 46 is made by bending the arcuate outer peripheral end of the terminal, its height gradually increases toward the root of the first terminal portion 45, to constitute a stopper for preventing the wire end 65 placed on the fusing terminal (the first terminal portion 45) from coming off from the gap 63 at the time of fusing. This permits the worker, in preparation for fusing the wire end 65 to the terminal 44, to pass the wire end 65 extending from below the unit main body 23 through the gap 63, engage it with the upright end of the second terminal portion 46, and lead it out (see FIGS. 10 and 12), so that the wire end 65 can be securely held by the terminal 44.

To describe the winding of the wire end 65 preparatory to the fusing specifically, first the wire end 65 is taken out from the back side of the terminal 44, as seen in FIG. 9. The wire end 65 is pulled up, as seen in FIG. 10, further through a recess 66 of the unit main body 43 up to the front side of the terminal 44, routed to the V-shaped opening side of the first terminal portion 45, further pulled deep into the V-shaped gap 63 and then pulled to the outside, so as to be caught with the upper end of the second terminal portion 46 for being prevented from coming off. The wire end 65 is subjected to fusing while it is placed in the V-shaped gap 63 of the first terminal portion 45 of the terminal 44. All the wire ends 65 are individually joined to the corresponding terminals 44.

Figure 13:
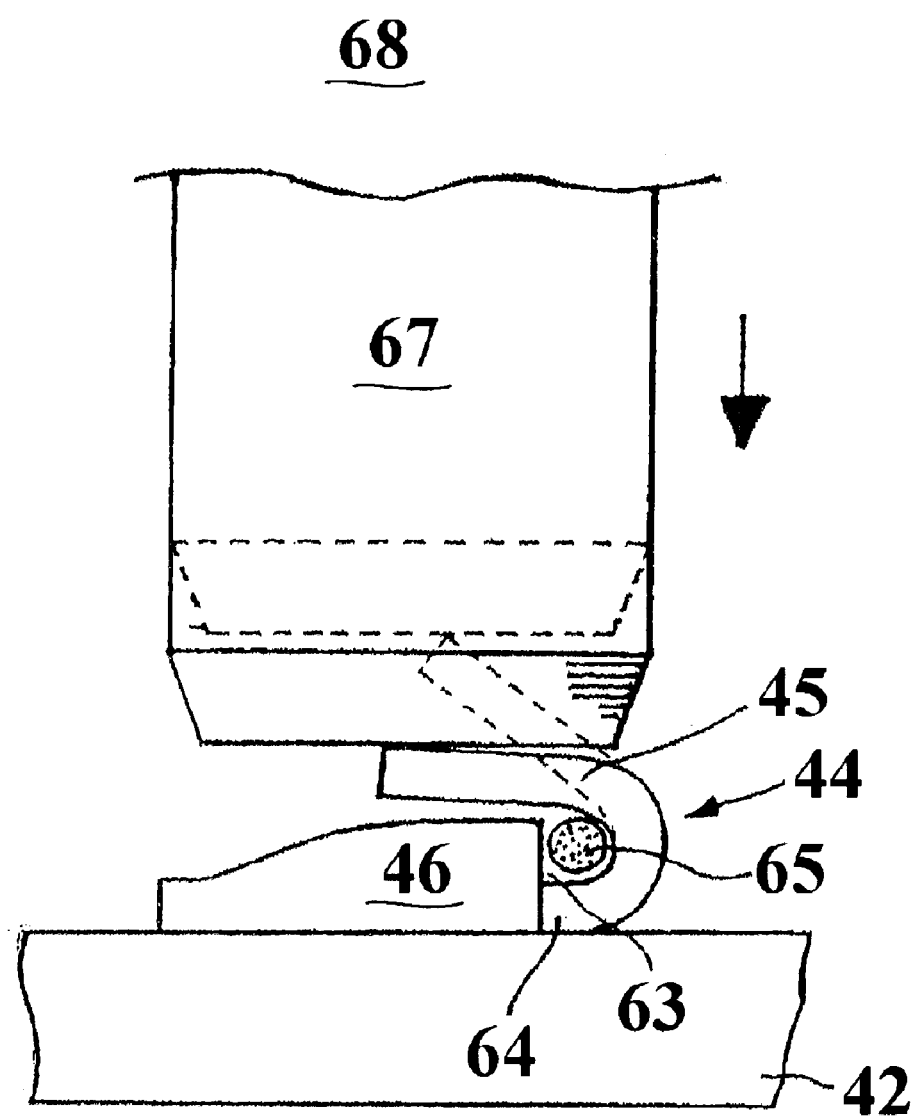
FIG. 13 is a further enlarged view looking in the same direction as FIG. 12, but shows the joining operation.

FIG. 13 is a simplified illustration of operation and construction of a fusing apparatus related motions of various portions of the terminal 44 at the time of fusing together the terminal 44 and the wire end 65. FIG. 13 shows an electrode bar 67 and an electrode receiver shown only partially and indicated by the reference numeral 68 of the fusing apparatus (the remainder of which is not shown). In the figure, the dotted line shows the terminal 44 before crimped in preparation for fusing, and the solid line shows the terminal 44 having been crimped and being heated by applying electric current to the electrode bar 67.

As shown in FIG. 13, the fusing is started by placing the terminal 44 and the wire end 65 to be joined together between the electrode bar 67 and the electrode receiver 68 when in a retracted position as shown in phantom. Then, the first terminal portion 45 toward the electrode receiver 68 is engaged with the tip of the electrode bar 67. Then a pressing operation is begun until the solid line position is reached. As a result, the first terminal portion 45 is deformed toward the terminal main portion 64, while the wire end 65 placed in the gap 63 to avoid the tendency of slipping out of the gap 63 (toward the left, in the figure) as the wire end 65 receives a pressing force from the first terminal portion 45 from above. However, since the wire end 65 is prevented from being displaced to the left and from slipping out of the gap 63 by the second terminal portion 46, the first terminal portion 45 can be crimped from above while the wire end 65 is placed in the gap 63, as shown by the solid line.

Then, electric current is applied to the electrode bar 67 in that state. As a result, the terminal 44 and the wire end 65 produce heat, which melts part of the wire end 65, so that the terminal 44 and the wire end 65 are finally joined together.

Figure 2:
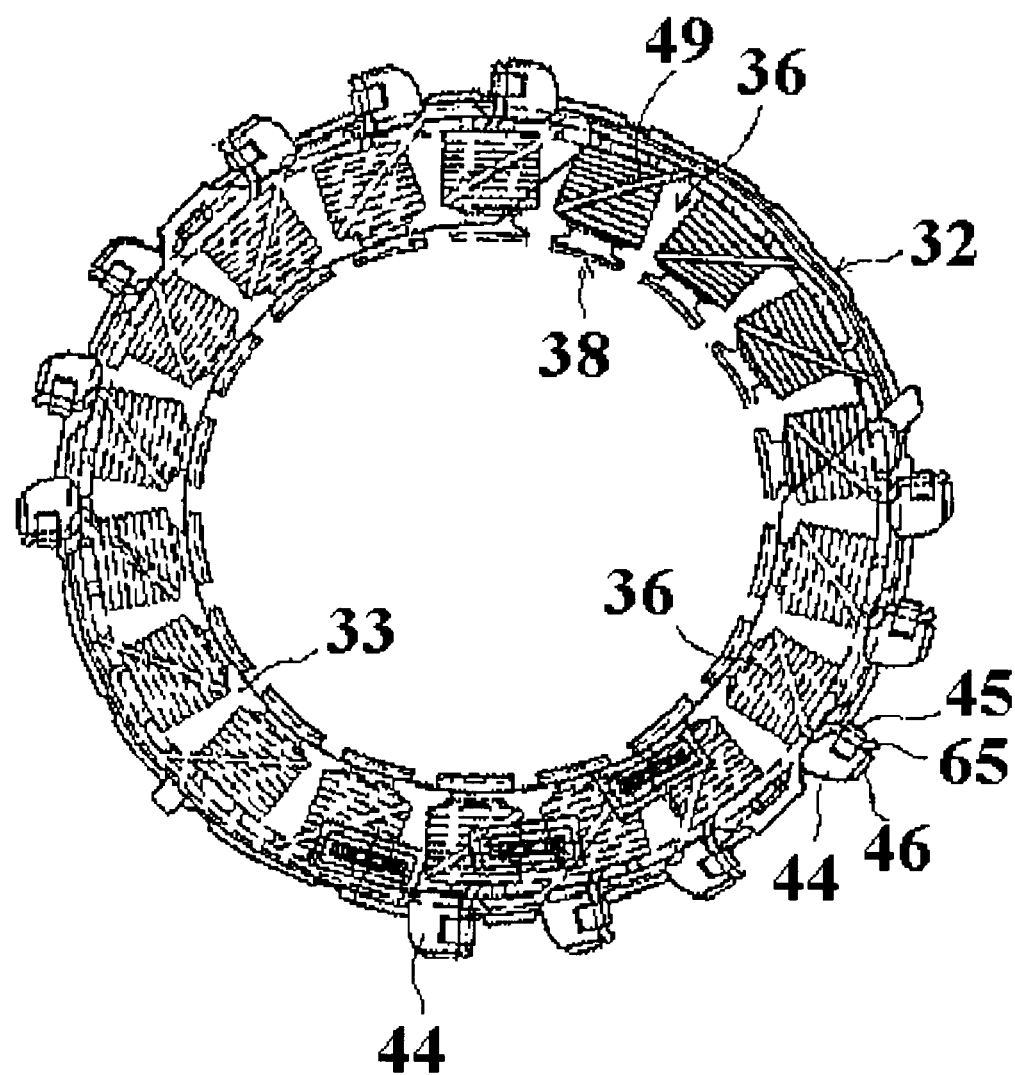
FIG. 2 is a side elevational view of the wound armature.

The above-described joining by fusing is applied to all the terminals 44 projecting from the periphery of the terminal wiring unit 33. Finally, all the wire ends 65 extending from all the coils 36 are joined to all the terminals 44, as shown in FIG. 2. As for this joining by fusing, since all the terminals 44 projecting from the terminal wiring unit 33 are at approximately the same height, positional adjustment of the electrode receiver 68 can be dispensed with or simplified when fusing of one terminal 44 is over and another is to be started, so that fusing work as a whole can be made faster. If the motion is programmed, fusing can be automated.

While a terminal for an armature according to this invention has been described above, taking an exemplary embodiment in which the terminal is made by bending a single sheet material, the terminal may also be made by joining together plural pieces of sheet material, as a matter of course. Of course those skilled in the art will readily understand that the described embodiments are only exemplary of forms that the invention may take and that various changes and modifications may be made without departing from the spirit and scope of the invention, as defined by the appended claims.

What is claimed is:

1. A terminal for an electrical armature for connecting a plurality of coil windings to an external connection, said terminal having an arcuate plate like portion formed from an electrically conductive material, at least one terminal tab extending in an axial direction from said plate like portion for receiving an external connecting member, a plurality of coil end winding terminals spaced around the circumference of said plate like portion for connection to coil winding ends, said coil end winding terminals being comprised of a pair of angularly related portions defining a gap to receive a coil winding end and a retaining portion facing said gap and positioned and configured to prevent a coil winding end from moving transversely out of said gap.

2. A terminal for an electrical armature as set forth in claim 1 wherein the winding terminals are formed by bent projections extending radially outwardly from the arcuate plate like portion.

3. A terminal for an electrical armature as set forth in claim 2 wherein the angularly related portions are integrally connected to the arcuate plate like portion and the retaining portion is integrally formed at a side of one of the angularly related portions spaced from the arcuate plate like portion.

4. A terminal for an electrical armature as set forth in claim 3 wherein the retaining portion has a radial edge that has a greater width adjacent a bight of the gap than portions spaced therefrom to facilitate placing a wire end in the gap.

5. A wiring board for an armature having a plurality of axially spaced plate like portions each having one terminal tab and winding terminals as set forth in claim 1 embedded in an insulating material.

6. A wiring board for an electrical armature as set forth in claim 5 wherein the winding terminals are formed by bent projections extending radially outwardly from the arcuate plate like portion.

7. A wiring board for an electrical armature as set forth in claim 6 wherein the angularly related portions are integrally connected to the arcuate plate like portion and the retaining portion is integrally formed at a side of one of the angularly related portions spaced from the arcuate plate like portion.

8. A wiring board for an electrical armature as set forth in claim 7 wherein the retaining portion has a radial edge that has a greater width adjacent a bight of the gap than portions spaced therefrom to facilitate placing a wire end in the gap.

9. A wiring board for an electrical armature as set forth in claim 8 wherein the angularly related portions are bent into engagement and fused to the wire ends.

* * * * *